(12) United States Patent
Makagon et al.

(10) Patent No.: US 7,823,167 B2
(45) Date of Patent: *Oct. 26, 2010

(54) METHOD AND APPARATUS FOR EXTENDING CONTACT CENTER CONFIGURATION DATA FOR ACCESS BY THIRD-PARTY APPLICATIONS OVER A DATA NETWORK

(75) Inventors: Petr Makagon, San Francisco, CA (US); Andriy Ryabchun, San Francisco, CA (US); Nikolay Anisimov, Concord, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 791 days.

This patent is subject to a terminal disclaimer.

(21) Appl. No.: 10/279,435

(22) Filed: Oct. 23, 2002

(65) Prior Publication Data

US 2004/0083482 A1    Apr. 29, 2004

(51) Int. Cl.
  *G06F 9/44* (2006.01)
  *G06F 15/16* (2006.01)
(52) U.S. Cl. .................. 719/328; 719/316; 709/230
(58) Field of Classification Search .............. 707/10; 719/319, 318, 328, 310, 316, 330; 709/230, 709/203
  See application file for complete search history.

(56) References Cited

U.S. PATENT DOCUMENTS

| | | | | |
|---|---|---|---|---|
| 5,920,719 A * | 7/1999 | Sutton et al. | ................. | 717/130 |
| 6,023,684 A * | 2/2000 | Pearson | .................... | 705/36 R |
| 6,314,430 B1 * | 11/2001 | Chang | .................... | 707/103 R |
| 6,401,094 B1 * | 6/2002 | Stemp et al. | ................... | 707/10 |
| 6,519,617 B1 * | 2/2003 | Wanderski et al. | .......... | 715/235 |
| 6,816,871 B2 * | 11/2004 | Lee | .......................... | 707/104.1 |
| 6,882,996 B2 * | 4/2005 | Preisig et al. | .................. | 707/4 |
| 7,080,092 B2 * | 7/2006 | Upton | ........................ | 707/102 |
| 7,159,224 B2 * | 1/2007 | Sharma et al. | .............. | 719/310 |

(Continued)

OTHER PUBLICATIONS

Thio et al., Distributed multimedia database: a design and application study, High Performance Computing in the Asia-Pacific Region, 2000. Proceedings. The Fourth International Conference/Exhibition on, May 14-17, 2000, On pp. 842-847 vol. 2.*

(Continued)

*Primary Examiner*—Van H Nguyen
(74) *Attorney, Agent, or Firm*—Central Coast Patent Agency, Inc.

(57) ABSTRACT

A system for transforming and transmitting communication-center configuration and service data from a communication-center environment to one or more third-party applications over a data network includes an intermediate service point connected to the network between the communicating parties, a set of application program interfaces for transforming and transmitting communication-center data from the center to the intermediate service point, and a set of application program interfaces for transmitting the communication-center data from the service point to one or more of the third party applications. In a preferred application, the third-party applications can be disparate platforms, and Java-based data is sent to the service point from the center and used for instantiating at least one data model, the model described as an XML document, which is rendered accessible in whole or part to a requesting third-party application or applications according to protocol used by the third-party application or applications.

6 Claims, 4 Drawing Sheets

U.S. PATENT DOCUMENTS

| | | | |
|---|---|---|---|
| 7,188,332 B2 * | 3/2007 | Charisius et al. | 717/104 |
| 7,246,358 B2 * | 7/2007 | Chinnici et al. | 719/315 |
| 7,590,987 B2 * | 9/2009 | Behrendt et al. | 719/328 |
| 2002/0026630 A1 * | 2/2002 | Schmidt et al. | 717/103 |
| 2002/0062346 A1 * | 5/2002 | Chen | 709/204 |
| 2003/0097457 A1 * | 5/2003 | Saran et al. | 709/230 |
| 2003/0105884 A1 * | 6/2003 | Upton | 719/318 |
| 2004/0044729 A1 * | 3/2004 | Foerg et al. | 709/203 |

OTHER PUBLICATIONS

Rodriguez-Martinez et al., MOCHA: a self-extensible database middleware system for distributed data sources, Proceedings of the 2000 ACM SIGMOD international conference on Management of data, Year of Publication: 2000, pp. 213-224, ISSN:0163-5808.*

Monson-Haefel, Enterprise Javabeans, 2000, O'Reilly, Second Edition, pp. 392-393.*

Curbera et al. "Unraveling The Web Services Web" An Introduction to SOAP, WSDL, and UDDI, Mar.-Apr. 2002, IEEE Internet Computing, pp. 86-93.*

Roger Wolter. "XML Web Services Basics," Microsoft Developer Network, Dec. 2001, XP002272523, http://msdn.microsoft.com/library/en-us/dnwebsrv/html/webservbasics.asp?frame=truc, May 3, 2004, pp. 1-4.

* cited by examiner

METHOD AND APPARATUS FOR EXTENDING CONTACT CENTER CONFIGURATION DATA FOR ACCESS BY THIRD-PARTY APPLICATIONS OVER A DATA NETWORK

FIELD OF THE INVENTION

The present invention is in the field of telephony communication and pertains more particularly to methods and apparatus that enable third-party created software applications to have access to configuration data relevant to a communication center environment, such access made available over a data network from a physically remote network location.

BACKGROUND OF THE INVENTION

Modern communication centers are becoming multimedia-capable and often service both analog and various forms of digital media interactions and transactions. In order to service a large public client base, state-of-the-art telecommunications equipment, software applications, and various dedicated servers are compiled and integrated with state-of-the-art software platforms. In addition to managing very high levels of communication events of various media types, internal management duties must be performed within the center itself. Such duties include tracking and managing historical data, client data, product data, service personnel data, and center configuration data. Moreover, many communication center hosts have multiple service sites that are connected through networks both analog and digital.

The inventors know of an object-oriented, communication center management system that is currently used within some centers. This system provides tools for client/agent interaction management, intelligent routing, historical database reporting, statistical compilation and reporting, communication event load balancing, and configuration management. Parts of the system are distributed, for example, to agent desktop terminals for contact management. Servers are provided to facilitate transactions in different media types such as chat, e-mail, and so on. Parts of the system are distributed to telephony switches to provide intelligent routing and client interaction capability both from within the system and in some cases into event-sponsoring networks. The system is automated in many respects and updates to configuration parameters of the system are made periodically to add new equipment, reconfigure agent desktop applications, re-assign personnel to various duties, configure local telephony switches for agent level routing, and other duties.

Due to an extraordinarily large number of distributed components and software applications, configuration parameters that must be tracked and managed are numerous. The above-described system provides management tools to communication-center administrators for managing and manipulating configuration parameters. For example, a configuration server and configuration manager application is provided and accessible to administrators. The tools use a configuration code library to identify, change and distribute configuration updates throughout the system.

A drawback to this system is that it is mostly internally administered using proprietary code and is platform-dependant. Communication-center administrators access the configuration server through an application program interface from a local area network that is typically Transfer Control Protocol/Internet Protocol (TCP/IP) enabled. A vehicle that is based on extensible markup language (XML) is available and known to the inventor for transmitting communication-center configuration data from one cooperating communication center to another in the case of multi-site centers. The vehicle is limited however, in that manipulation of data cannot be performed on the fly, that is, in real time. Therefore, the system is not suitable for third-party integration of center configuration data with other third-party management facilities such as customer relations management (CRM) applications.

What is clearly needed in the art is a platform-independent, standard-based, and Internet-oriented system and method that enables configuration of call centers to be saved and, if desired, transferred from one call center to another regardless of platform utilization.

SUMMARY OF THE INVENTION

In a preferred embodiment of the present invention a system for transforming and transmitting communication-center configuration and service data from a communication-center environment to at least one third-party application over a data network is provided, comprising an intermediate service point connected to the network between the communication-center environment and the at least one third-party application, a set of application program interfaces for transforming and transmitting communication-center data from the center to the intermediate service point, and a set of application program interfaces for transmitting the communication-center data from the service point to one or more of the third party applications. The system is characterized in that the incoming data into the service point is of the form of a common machine-readable language used by the service point to instantiate at least one data model rendered accessible to the at least one third party application and wherein upon request a whole or portion thereof is transformed into a machine-readable descriptive language and presented to a requesting third-party application or applications according to protocol used by the third-party application or applications.

In a preferred embodiment the data network is the Internet network. Also in a preferred embodiment the data network is the Internet network combined with at least one sub-network. Still in a preferred embodiment the machine-readable language incoming into the service point from the communication-center is Java-based. The machine-readable language output from the service point to one or more third-party applications may be XML-based.

In some embodiments the service point facilitates access to and manipulation of configuration data, statistical data, queue-service data, and interactive-voice-response service data. Also in some embodiments the service point is a Web server hosted on the Internet network and data is accessible to the third-party applications through a set of Web services. The XML-based data may be transported in SOAP-based messages. In some cases the set of Web services is described using WSDL and/or UDDI languages.

In another aspect of the invention an intermediary service point hosted on a data network for transforming and transmitting communication-center configuration and service data from a communication-center environment to at least one third-party application over the network is provided, comprising at least one application interface between the service point and the at least one third-party application, a data processing engine for receiving and processing communication-center data, and at least one Java-capable server driver for facilitating communication between the service point and one or more data servers hosted in the communication center. The service point is characterized in that the data processing engine receives Java-based communication-center data, instantiates at least one data model from the receive data, the at least one data model described as an XML document and wherein XML messaging is used to transport requested portions or a whole of the at least one data model to requesting third party applications over the host network.

In a preferred embodiment the data network is the Internet network. Also in a preferred embodiment the data network is the Internet network combined with at least one sub-network. In some embodiments the service point facilitates access to and manipulation of configuration data, statistical data, queue-service data, and interactive-voice-response service data. Also in some embodiments data is accessible to the third-party applications through a set of Web services. Further, XML message data may be transported in SOAP-based messages. In some cases the set of Web services is described using WSDL and/or UDDI languages.

In further embodiments the at least one third-party application is a customer-relations-management application. Also in some embodiments the at least one third-party application is a thin-client application, and the at least one data model may contain data presentation logic and data transformation logic. In some cases a Java configuration library is used in communication between the at least one data server in the communication center and the data processing engine, and in some cases the at least one data server includes a configuration server, an IVR server, a statistical server, a transaction server, and a plurality of media servers.

In yet another aspect of the invention a method for transforming and transmitting communication-center configuration and service data to at least one third-party application over a data network is provided, comprising steps of (a) providing an intermediary service point connected to the data network in between the communication center and the at least one third party application; (b) transforming the communication-center data to a common machine-readable language for input into the service point; (c) instantiating at least one data model at the service point from received communication-center data; (d) describing the at least one data model at the service point as an XML document; and (e) transmitting a portion up for a whole of the at least one data model from the service point to a requesting third-party application using an XML transport mechanism.

In some embodiments of the method, in step (a), the intermediary service point is a Web server connected to the Internet and data is accessible through a set of Web services hosted in the server. Also in some embodiments, in step (a), at least one of the third-party applications is a customer-relations-management application. Further, in some embodiments, in step (b), the common machine-readable language is Java-based. Still further, in some embodiments, in step (c), the at least one data model includes a communication-center configuration data model. In step (e) the XML transport mechanism may be SOAP-based messaging, and the set of Web services may be described using WSDL and/or UDDI.

BRIEF DESCRIPTION OF THE DRAWING FIGURES

DESCRIPTION OF THE PREFERRED EMBODIMENTS

According to a preferred embodiment of the present invention, the inventor provides a method and apparatus for enabling platform-independent data access to communication center configuration data for use by third-party systems and applications. The methods and apparatus of the invention are described in enabling detail below.

Figure 1:
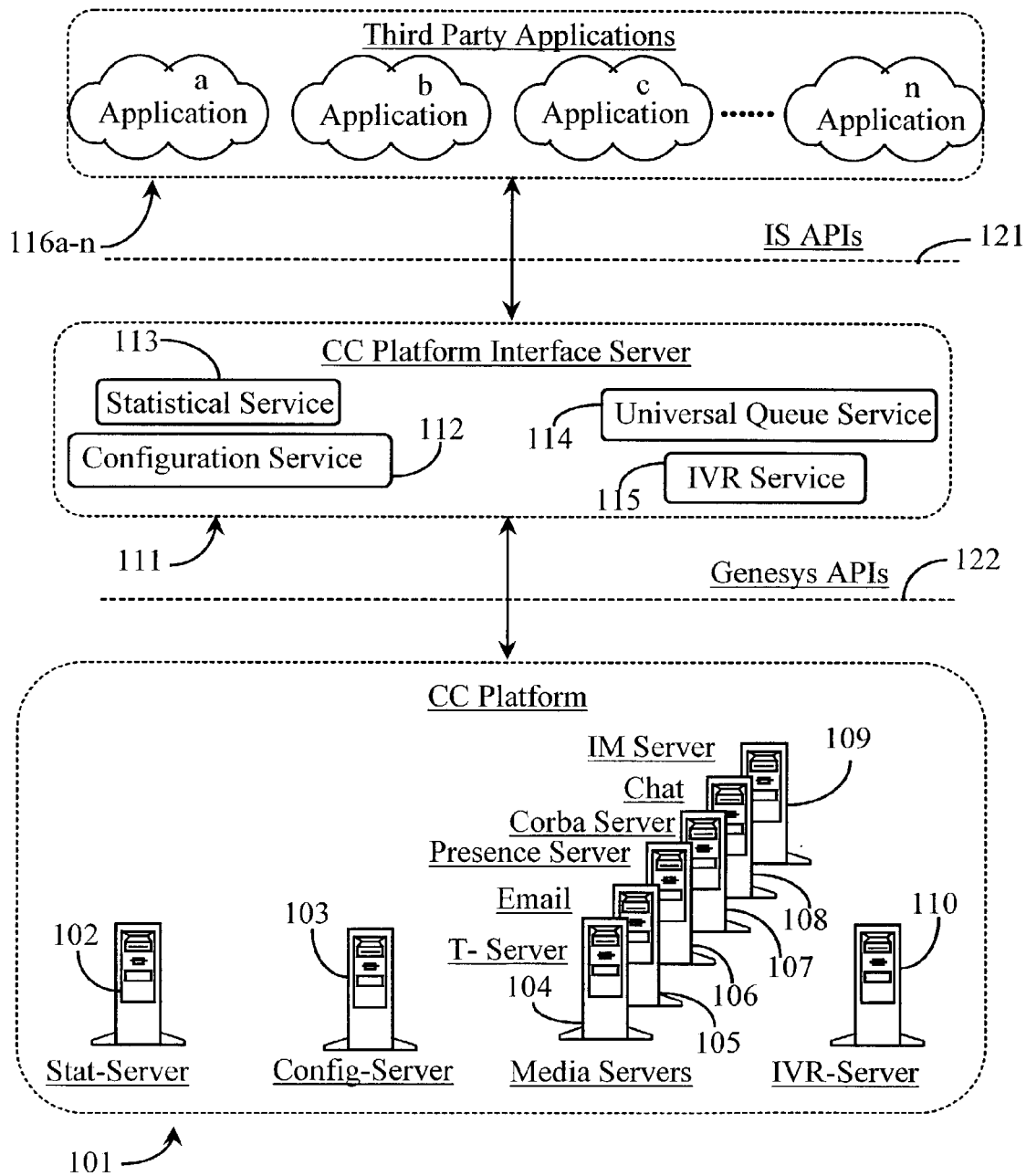
FIG. 1 is an architectural overview of an interface sever for bridging third-party applications to communication-center configuration environment according to an embodiment of the present invention.

FIG. 1 is an architectural overview of an interface sever 111 for bridging third-party applications 116 a-n to communication-center configuration environment 101 according to an embodiment of the present invention. Communications-center platform 101 is a state-of-the-art object-oriented platform that is enabled by a rather complex data-model that can change dynamically in terms of attributes of the model. Platform capabilities equate essentially to available services made possible through provision of equipment and software that enable a state-of-the-art communication-center environment.

Platform 101 includes a plurality of media-based interaction services illustrated as a plurality of media servers. For example, a transaction server T-Server 104 serves intelligent routing routines including queuing protocols and the like. T-server 104 operates according to communication center rules and may initiate routing routines based on a wide variety of conditions and available data. For example, agent-level routing may be performed based on agent availability, agent skill level, statistical conditions, call load conditions, or any combination of these and other characteristics and variables. T-server 104 is important in center service in terms of efficient routing of all media type interactions. Although not illustrated in this embodiment, T-server 104 also handles all connection-oriented switched network (COST) interaction routing (typical telephone voice transactions, for example).

An e-mail server 105 is illustrated in this example and provides a central routing point for all incoming and outgoing e-mails and video mails. A presence server 106 is illustrated in this example and is adapted to report presence information on all agent or system destinations that may be involved in interaction events. A chat server 108 is illustrated in this example and is adapted as a central server for hosting scheduled and impromptu chat sessions, and is typically hosted by one or more dedicated service agents. An instant message (IM) server 109 is illustrated in this example and is adapted for brokering instant messages between agents in the center and in some cases, between agents and connected clients. A Corba server 107 provides middleware components required to translate relational data to object-oriented entities and reverse order in an object-oriented telecommunications system environment.

The media server types illustrated in this embodiment should not be collectively quantified as a limitation of services available from within platform 101, as there may be fewer or additional services provided without departing from the spirit and scope of the invention. The inventor intends to demonstrate only an exemplary list of the types of services available in a state-of-the-art communications center environment.

A statistics server (Stat-Server) 102 is illustrated within platform 101 and is adapted to serve various and sundry statistical information for aid in such as better routing and CC performance evaluation. An interactive-voice-response server (IVR-Server) 110 is illustrated in this example and provides control for point-to-point automated interaction with clients both in a computer-telephony-integrated (CTI) COST sense and in an Internet-protocol-network-telephony (IPNT) sense, provided that platform 101 is a dually-capable platform (handling both COST and DNT interaction). A configuration server 103 is illustrated in this example and is adapted to store and provide configuration data for all systems and entities including software that are utilized within the domain of platform 101.

It is assumed in this example that all servers and services represented within the domain of platform 101 are interconnected for communication and data access by at least an internal local-area-network (LAN) that also connects agents and administrators for communication and data access. It is also assumed that the domain of platform 101 is not strictly limited in a physical sense as some servers described above may be distributed singularly or in plural to network-level points outside of a communication center. The CC also typically will include internal (DN) telephone wiring and trunk connections for transactions, as well as DNT connections.

As was described in the background section, there are a relatively large number of configuration parameters relating to equipment, software and services of platform 101 that must be managed and updated to provide continuous and optimal function of the center as a whole. As center capabilities and services are upgraded and, perhaps other services added to the system, configuration parameters related to those changes must be saved and stored for later access. If a center-host has multiple center locations, then the configuration data for center equipment and services must be duplicated in part or in whole and distributed to sister sites for implementation. In current art, this assumes that same equipment types, connection types, and software are used at all of the cooperating sites. Furthermore, in the time that it takes to configure multiple sites for active service, original configuration data elements may have been modified, upgraded, replaced with other configuration data and so on. Because current data synchronization implements are typically proprietary and are built around a common platform, third-party applications and systems that operate according to variant platforms are naturally excluded from participation.

In order to overcome the limitations of same-platform, proprietary data synchronization vehicles, the inventors provide a unique communication-center platform-interface server 111 comprising a computer-readable medium. Computer-readable medium, as well known in the art, refers to a storage medium implemented as a hardware device integrated within a computerized device wherein information stored on said medium is encoded in a form which can be read by a computer and interpreted by the machine's hardware and/or software. Server 111 uses a variety of accepted and standard descriptive languages to promote data access and synchronization capabilities to third-party applications 116*a-n* that may not be based on the same platform or even use the same system components or software as the CC platform. Platform interface server 111 makes current configuration data and center-related data available on request or, in some embodiments, following a data push model.

Platform interface server 111 communicates with the CC platform through one or more application program interfaces (APIs) 122. Server 111, in a preferred embodiment, is hosted on the Internet network in the form of a universal Web-service accessible to all authorized parties. In another embodiment, server 111 may be internal to platform 101 and accessible through a private network. In still another embodiment, server 111, or a version thereof, may be provided as a CTI-service control point (SCP) in a COST network such as the public-switched-telephony-network.

A primary responsibility of interface server 111 is to take in all applicable data from the communication center environment and transform the data into standard descriptive language that can be understood and utilized by a variety of third party systems and applications.

Server 111 includes a configuration service 112 for relaying critical configuration data for the purpose of enabling third-party applications 116*a-n* to configure their sites and systems for interaction with the communication center platform and to operate in a whole or limited fashion as the original communication center would operate. Server 111 also provides a statistics service 113 that renders current statistics related to performance, load balancing, and other types of functions generic to the host platform available to third-party applications 116. Server 111 offers a universal queue service 114 adapted to provide optimum queuing services and configuration to applications 116*a-n*. Server 111 also provides an IVR service that can be used by applications 116*a-n* to interact with their clients.

Applications 116*a-n* comprise exemplary third-party telecommunications applications. Applications may consist of DNT telephony applications, CTI applications, CRM applications, and so on. It is assumed in this example that applications 116*a-n* are known to the inventor and that application program interfaces have been developed that enable them to use the present invention successfully. Third-party applications communicate with interface server 111 using APIs such as Interface Server (IS) APIs 121.

In one embodiment of the present invention, APIs 121 are actually hosted within platform interface server 111. In this case, a particular third-party application 116*a*, for example, can select the appropriate interface from a menu provided by server 111. In another embodiment, IS APIs 121 are plug-in client modules that can be distributed to third parties or downloaded from the site by third parties. Third-party applications 116*a-n* may utilize any required portion of available configuration data and services offered through server 111. For example, a COST only communication center running a variant platform may only require queuing services. In that case, only queuing service data is provided to that particular application.

Server 111 transforms the data itself from communication center platform code to one of a variety of universal and standard descriptive languages. Through API 121 or within server 111 itself, the universal language is then transformed into code applicable to the requesting platform for implementation according to its existing data model. In this way, a third party can implement queue services, for example, that are operated and function according to the common parameters or attributes of both platforms. A requesting platform may not utilize all of the capabilities of service 114 or any other offered service for that matter, if the constraints of the equipment supported by the platform are limited. However, the service can be acquired and installed relative to all of the functions that are feasible.

After a third-party application is configured and is using one or more services offered through server 111, then configuration updates can be pushed to the third parties as they become available. Likewise, a third party application can be notified of existing updates and then may connect to server 111 for automated synchronization, wherein the updates are downloaded and automatically installed. Relatively complex data models, one belonging to the host communication center platform and one belonging to the requesting third party application can be rendered in the same universal descriptive language wherein the likenesses of the models and the differences of the models can be isolated to determine what, if any, available services can be effectively provided to and configured for the requesting application. There are many possibilities.

Figure 2:
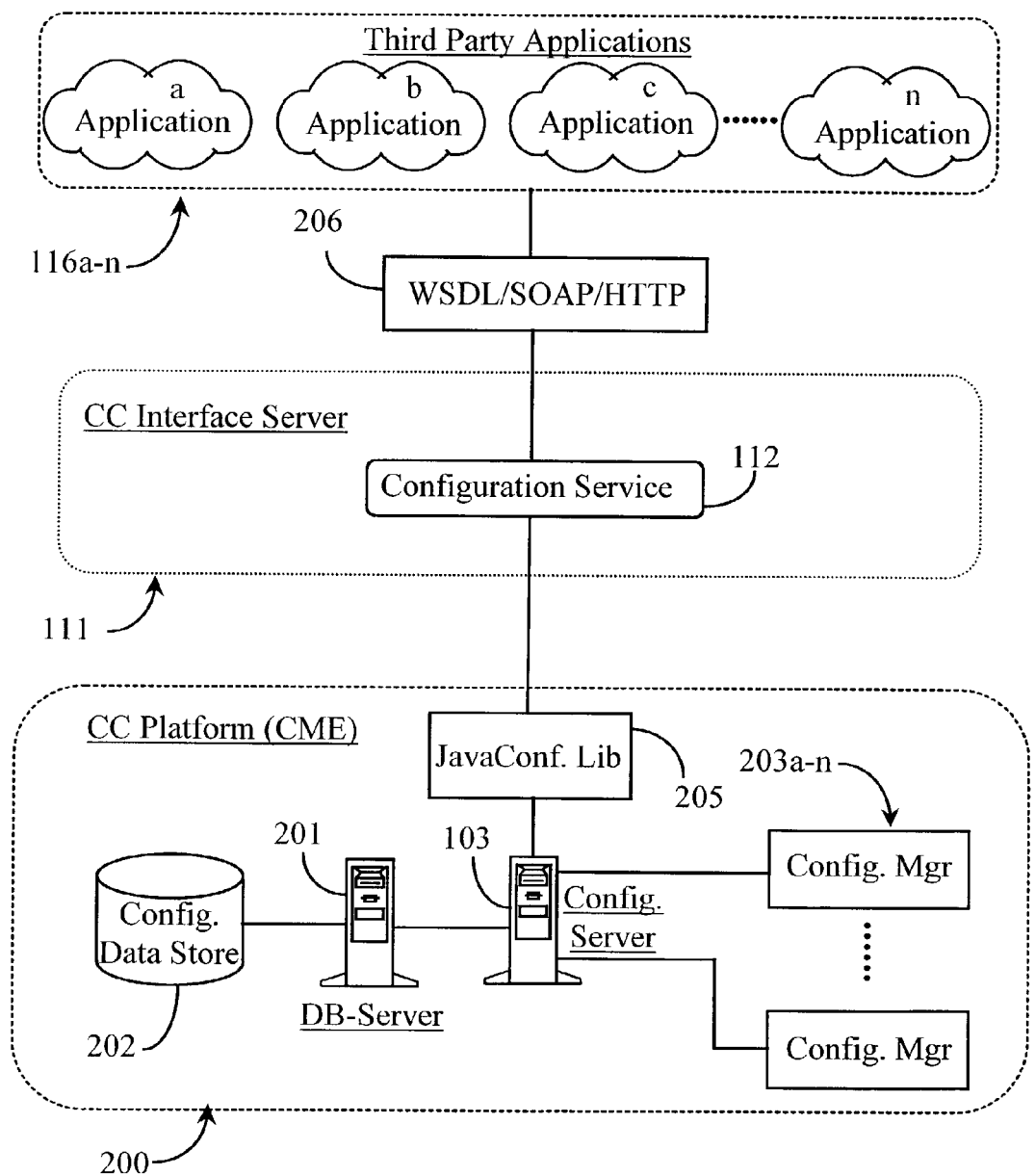
FIG. 2 is an architectural overview of the configuration service of FIG. 1 and network connection between third-party applications and a communication center configuration management environment.

FIG. 2 is an architectural overview of the configuration server 111 of FIG. 1 and network connection between third-party applications 116 and a communication center platform configuration management environment (CME) 200. CME 200 is part of the communication center platform 101 described with reference to FIG. 1. It is that part that enables configuration management of all servers, processors, software, switches, interfaces, and other like components that make up a telephony or multimedia communication center system.

CME 200 comprises configuration server 103 described previously with regard to the example of FIG. 1 and supporting components including configuration manager applications 203a-n, a configuration database repository 202, a database server 201, and a Java configuration library 205.

An instance of configuration manager 203a-n exists for each communication center entity that requires configuration and configuration management services. Instances 203a-n are part of a same extendable program wherein new configuration manager instances can be spawned as required. Configuration manager is installed and executable within server 103 in a preferred embodiment. Server 103 is supported by a repository 202 that contains all of the most current configuration data values for all configurable entities within the CC platform. Database server 201, running database software (not shown) communicates with server 103 to provide data access and update capability of repository 202, such activity performed by server 103.

Server 103 also has access to a Java Configuration Library (JavaConf.Lib.) 205 for the purpose of translating configuration data into Java-based messaging including self executables (beans). Server 111 requests information pertaining to configuration data from server 103 as a result of a request from one of applications 116a-n. Server 111 is an intermediate server that links third-party applications 116a-n to configuration server 103. As previously described, server 111 is, in a preferred embodiment, a Web server that may be accessed by third-party applications 116a-n.

Server 111 uses a communication protocol stack 206 that enables Web-Service Description-Language (WSDL), Simple-Object-Access-Protocol (SOAP) messaging, Hyper-Text-Transfer-Protocol (HTTP), and Universal Description, Discovery and Integration UDDI, which are all well-known standard and accepted Web-based protocols. In a particular application, communication center configuration data transferred to server 111 from server 103 is presented, in a preferred embodiment as a Web service or as a set of Web services (configuration service 112). Server 111 may use a proprietary data interface to communicate with server 103 while applications 116a-n communicate with server 111 via a secure socket layer (SSL) connection over the Internet, for example.

From the point of view of applications 116a-n, in a preferred embodiment the entire configuration of the host communication center platform is presented as an XML document transported using SOAP and HTTP. In a preferred embodiment, the XML-based protocol facilitates reading, updating, and monitoring changes in the XML (configuration) document, for example: values of configuration elements and attributes. This protocol enables manipulation of different elements without changing the whole document (configuration) and also enables notifying any client application 116a-n about current changes in the XML configuration document, hence changes in configuration data. It is important to note that the scope of access to an entire configuration document depends on the nature and scope of the requesting application. In many cases only specific parts of the entire configuration document apply. WSDL and UDDI are languages defining the service structure and enabling identification of service parts or sub-services.

Platform 200 is illustrated in this example as the compilation of components that are relative to configuration service 112. For example, configuration server 103 has instances 209a-n of configuration manager modules. It is assumed in the example that there is a configuration manager for each configurable components of the CC environment. In practice, configuration service 112 facilitates manipulation of configuration manager instances 209a-n utilizing a Java configuration library (JavaConf.Lib) 205. Library 205 contains all of the required Java code to facilitate transport of any configuration data results accessed through configuration service 112.

Configuration database repository 202 is provided to store all of the current configuration elements of the entire communication center platform. Database server 201 is provided having access to repository 202 for serving any requested configuration data, and for storing new configuration data into repository 202 if authorized. In practice of the invention, one or more applications gain access using Internet protocol (typically request/response) to interface sever 111 and configuration service 112, which may include sub-services. Access is controlled for security through SSL or other applicable regimens. Interface server 111, as a proxy, accesses configuration server 103 through a proprietary interface using Java transport mechanisms and protocols. Result data is transformed from Java to an appropriate protocol for ready implementation at a requesting application site.

Figure 3:
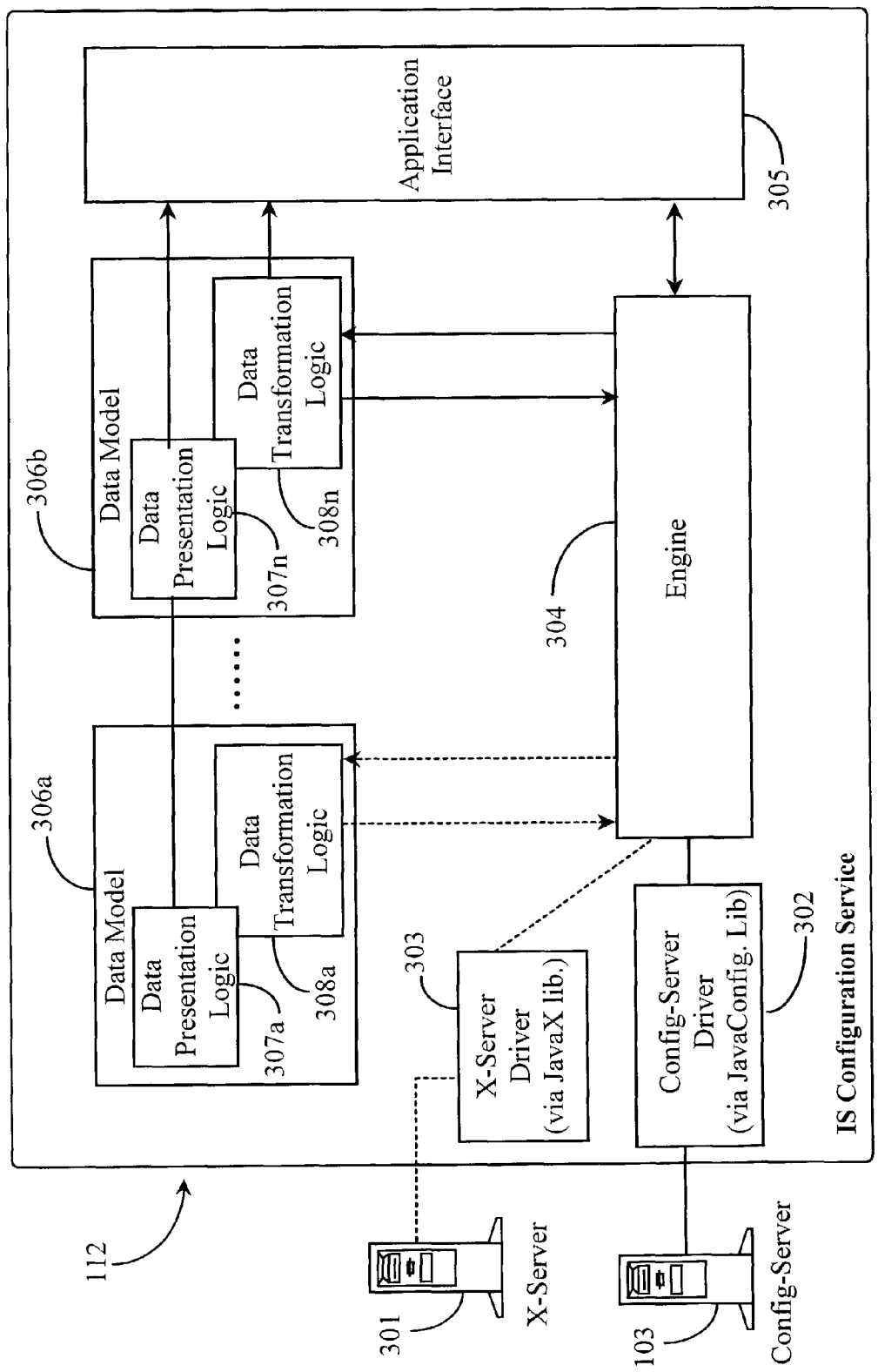
FIG. 3 is an architectural overview of the internal components of the configuration service of FIG. 1 according to an embodiment of the invention.

FIG. 3 is an architectural overview of internal components of configuration service 112 of FIG. 1 according to an embodiment of the invention. Service 112 presents options to requesting users through an application interface 305. Application interface 305 includes protocol stack 206 described with reference to FIG. 2. Interface 305 functions as an interface for a configuration "wizard" in a preferred embodiment. That is to say the requesting clients operating, for example, through a Web server, are presented with a configuration wizard, which would be analogous to configuration service 112 as a whole. Interface 305 is responsible for interface with third party applications 116a-n described with reference to FIG. 2. More particularly, engine 304 parses and generates XML messages and facilitates their transmission via SOAP/HTTP protocol stack 206.

Engine 304 has direct access to configuration server 103 and related components described with reference to FIG. 2 using a configuration server driver 303 that communicates with server 103 through Java library 205 described with reference to FIG. 2. An X-server 301 is illustrated in this example and is adapted to serve pre-selected services such as IVR, queue and statistical services described with reference to FIG. 1 above. X-server 301 is a logical implementation of all of the media servers described with reference to FIG. 1, and communicates with engine 304 using one or more X-server drivers 303 that utilize a JavaX library for code.

Engine 304 is responsible for generation of accurate and up-to-date data models illustrated herein as models 306a and 306n for presenting model-dependant data. Data models 306a through n are exemplary of portions of or entire configuration data models that may be required to full fill third-party requests.

Within each data model 306a-n there are data presentation logic modules 307a-n adapted to present object representative data to third-party applications. Each data model 306a-n also has data transformation modules 308a-n adapted to provide the required transformations into descriptive languages used by third-party applications.

All data model-dependant processing as well as all data-independent model processing occurs within engine 304. The external representations of data models 306a-n and accompanying modules for presentation and transformation are logically illustrated in this example for explanative purpose only. In practice, it is possible that a configuration data model will contain many objects that represent actual communication center entities. Because objects have elements and attributes, a complex network structure emerges wherein several data models share configurable elements and attributes.

Figure 4:
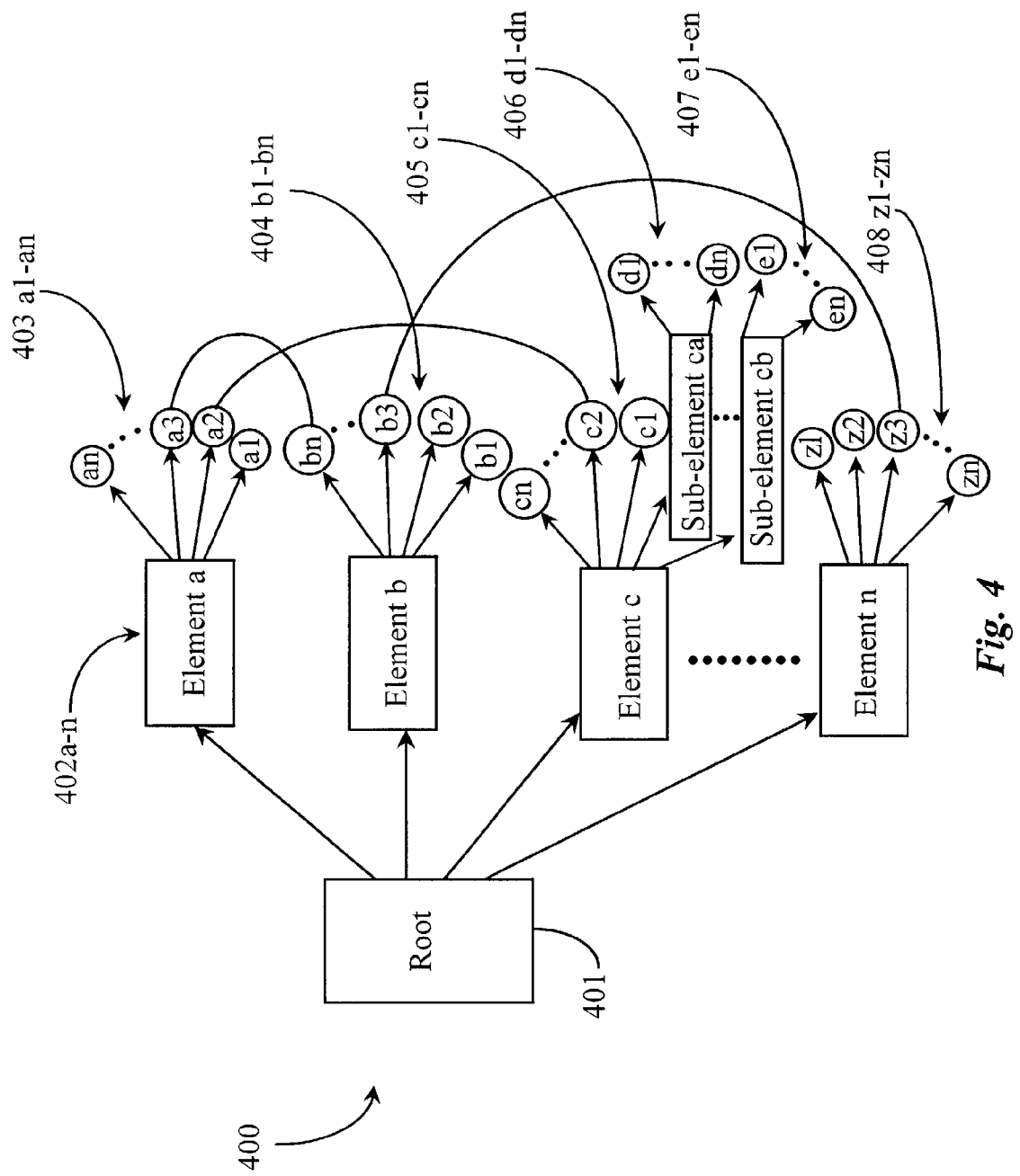
FIG. 4 is a data model example of a configurable component according to an embodiment of the invention.

FIG. 4 is a block diagram illustrating an exemplary data model 400 of configurable communication-center elements according to an embodiment of the present invention. Data model 400 is analogous to data models 306a-n described with reference to FIG. 3 above. Model 400 has a root element 401, which is the abstract root of the model. Root 401 may be the entire communication center itself or it may be a portion of the center in a case where only a portion of a data model is required by a third party. Therefore, the term root as applied in this specification implies the main element of the portion of data model presented to a third party.

Root 401 has a plurality of configurable elements 402a-n. Elements 402a-n may represent a wide variety of communication-center objects. Elements 402a-n have attributes. For example, element 402a has attributes 403 a1-an. Element 402b has attributes 404 b1-bn. Element 402c has attributes 405c1-cn as well as configurable sub-elements, sub-element ca and sub-element cb. Element 402n has attributes 408 z1-zn. Sub-element ca has attributes 406d1-dn, and sub-element cb has attributes 407e1-en.

It will be appreciated by one with skill in the art of object modeling that there may, in practice, be many more configurable elements, sub-elements and attributes present and represented in an exemplary model than are illustrated in this example without departing from the spirit and scope of the present invention. The inventor shows modest numbers of elements, sub-elements and attributes for the purpose of simplicity in explanation only.

In object modeling it is known and accepted that there may be more than one sub-element and attribute that occurs in model instantiation wherein the sub-elements and/or attributes are common to more than one configurable element. For example, if root 401 is an agent group and elements 402a-n are current agents logged into the agent group, then attributes of the agents may represent individual agent skills, for example. In this case agent 402a has a skill attribute 403 a3 that is identical to an attribute of agent 402b, namely attribute 404bn. Following this logic, agent 402a also has an attribute in common with agent 402c (a2, c2). Likewise, agent 402b has an attribute in common with agent 402n (b3, z3). Therefore, a query using W3C accepted Xpath mechanism may be initiated to find the element b having an attribute equal to, for example, attribute z3 of element n. Then the expression would be /B [@b3=/N [@z3]].

In another example, a third-party may want to read configuration data relevant to one of configurable elements 402a-n, which are in this case agents. If the agent has a name John Smith, then an expression using Xpath might read: person [@LastName="Smith" and @ FirstName="John" and @isAgent="1"].

Third-party applications can access communication center configuration data related to a whole of or a portion of a communication center data model. Since a communication center data model has attributes that evolve and change periodically, a third-party application may pre-set to be notified of any specific changes in specific portions of the model that are relevant to the application. For example, if a third-party application wishes to be notified the next time that an outbound call campaign is initiated within the center then it can preset to receive configuration data relative to the campaign including participating agents, switches, servers, and agent attributes including call lists, called numbers, and client identifications. In this case, the third-party application could be a CRM application designed for after care of the target clients solicited by the specific agents involved in the campaign. The desired attributes required by the third party may be the agent call lists, statistical data for each agent hit ratio, percentage of sales per list, and so on. There are many possibilities.

The methods and apparatus of the present invention can be used in a variety of communication-center environments including CTI-COST centers and DNT-capable centers. The present invention can be practiced over a variety of data networks including the Internet network wherein access to configuration data is presented in the form of a Web service or service-set. Other methods for presentation of data to third-party interfaces are also possible. For example, IVR rendition may be used over a COST connection. Wireless Markup Language can be used with a digital cellular telephone or other wireless network device. Third-party thin-client applications and robust third-party mainframe systems alike can benefit from the methods and apparatus of the present invention.

The methods and apparatus of the present invention should be afforded the broadest scope under examination. The spirit and scope of the present invention shall be limited only by the following claims.

What is claimed is:

1. A system including at least one processor for transforming and transmitting communication-center configuration and service data from a communication-center environment to one or more third-party applications over a data network comprising:

a software application executing on a Web server from a non-transitory computer-readable medium, the software application coupled over a wide area data network to both a first communication-center and a second communication center; and a set of application program interfaces (APIs) transmitting at least first communication-center configuration and service data from said first communication-center to said server executing said software application;

wherein the configuration data transmitted to the software application is transformed by the software application to be compatible with software and hardware operating at the second communication center, and is transmitted in the transformed state to the second communication center, the configuration data is used at the second communication center to configure software and hardware allowing interaction with hardware and software at the first communication center and to operate in a whole or limited fashion as the first communication center operates, wherein the configuration data is Java-based data and comprises one or more of statistical data, queue-service data, and interactive-voice-response service data, and wherein the software application executes on the Web server hosted on the Internet network and configuration data is accessible to the second communication center through a set of Web services.

2. The system of claim 1 wherein the wide-area data network is the Internet network.

3. The system of claim 1 wherein the wide-area data network is the Internet network combined with at least one sub-network.

4. The system of claim 1 wherein the second communication center is a customer relations management (CRM) system.

5. A method for transforming and transmitting communication-center configuration and service data from a communication-center environment to one or more third-party applications over a data network, comprising steps of:

coupling a software application executing on a Web server from a non-transitory computer-readable medium between a first communication-center and a second communication center over a wide-area data network;

transforming by the software application communication-center configuration and service data provided by said first communication center from a first form used by the communication center to a form usable by the second communication center;

transmitting over the wide-area data network at least requested portions of the configuration and service data to the second communication system; and configuring software and hardware at the second communication center using the received configuration and service data allowing interaction with hardware and software at the first communication center and to operate in a whole or limited fashion as the first communication center operates, wherein the configuration data is Java-based data and comprises one or more of statistical data, queue-service data, and interactive-voice-response service data, and wherein the software application executes on the Web server hosted on the Internet network and configuration data is accessible to the second communication center through a set of Web services.

6. The method of claim 5 wherein the second communication center is a customer-relations-management system.

* * * * *